United States Patent
Liljeström

(10) Patent No.: US 12,457,075 B2
(45) Date of Patent: Oct. 28, 2025

(54) CHANNEL STATE INFORMATION OVERHEAD REDUCTION BY NETWORK SIGNALED USER EQUIPMENT SPECIFIC ADJUSTMENTS BEFORE MEASUREMENTS

(71) Applicant: NOKIA TECHNOLOGIES OY, Espoo (FI)

(72) Inventor: Henrik Christian Liljeström, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 449 days.

(21) Appl. No.: 17/981,367

(22) Filed: Nov. 4, 2022

(65) Prior Publication Data

US 2024/0154755 A1    May 9, 2024

(51) Int. Cl.
*H04L 5/00*    (2006.01)
*H04W 24/10*    (2009.01)

(52) U.S. Cl.
CPC .......... *H04L 5/0051* (2013.01); *H04W 24/10* (2013.01)

(58) Field of Classification Search
CPC ...... H04L 5/0051; H04W 24/10; H04B 7/048; H04B 7/0663; H04B 7/0421
See application file for complete search history.

(56) References Cited

U.S. PATENT DOCUMENTS

| | | | |
|---|---|---|---|
| 2021/0385828 A1 | 12/2021 | Ahmed Salem et al. | |
| 2024/0031934 A1* | 1/2024 | Si | H04W 64/006 |
| 2024/0224084 A1* | 7/2024 | You | H04W 24/02 |
| 2024/0372608 A1* | 11/2024 | Park | H04B 7/18519 |

FOREIGN PATENT DOCUMENTS

| | | | | |
|---|---|---|---|---|
| CN | 118202606 A | * | 6/2024 | H04L 5/0098 |
| WO | 202214478 A1 | | 7/2022 | |
| WO | WO-2022144778 A1 | * | 7/2022 | H04B 7/0478 |

OTHER PUBLICATIONS

Machine Translation of WO-2022144778-A1 (Year: 2021).*
Machine Translation of CN 118202606 A (Year: 2022).*
Extended European Search Report dated Aug. 6, 2024 in corresponding European Patent Application No. 23204237.4-1206.
Partial European Search Report dated Mar. 19, 2024, corresponding to European Patent Application No. 23204237.4.

(Continued)

*Primary Examiner* — Khaled M Kassim
*Assistant Examiner* — Noah James Sugden
(74) *Attorney, Agent, or Firm* — Carter, DeLuca & Farrell LLP

(57) ABSTRACT

Systems, methods, apparatuses, and computer program products for reducing overhead associated with channel state information through the use of network signaled user equipment specific adjustments that can be applied by the user equipment before measurement of reference signals are provided. For example, a method can include receiving a configuration from a network and receiving reference signals from the network. The method can also include adjusting the received reference signals based on the configuration prior to performing measurements on the adjusted received reference signals. The user equipment can provide a report based on the measurements to the network.

1 Claim, 8 Drawing Sheets

(56) References Cited

OTHER PUBLICATIONS

Ericsson: "Csi enhancements for Multi-TRP and FR1 Fdd reciprocity", 3GPP Draft; R1-2103543, 3rd Generation Partnership Project (3GPP), Mobile Competence Centre ; 650, Route Des Lucioles ; F-06921 Sophia-Antipolis Cedex; France; Apr. 7, 2021.
Huawei et al: "CSI enhancement for coherent JT and mobility", 3GPP Draft; R1-2208441, 3rd Generationpartnership Project (3GPP), Mobile Competence Centre ; 650, Route Des Lucioles ; F-06921 Sophia-Antipolis Cedex; France; Sep. 30, 2022.
3rd Generation Partnership Project; Technical Specification Group Radio Access Network; NR; Radio Link Control (RLC) protocol specification (Release 17); 3GPP TS 38.322, v17.1.0, Jun. 2022.
3rd Generation Partnership Project; Technical Specification Group Radio Access Network; NR; Medium Access Control (MAC) protocol specification (Release 17); 3GPP TS 38.321, v17.2.0, Sep. 2022.
3rd Generation Partnership Project; Technical Specification Group Radio Access Network; NR; Radio Resource Control (RRC) protocol specification (Release 17); 3GPP TS 38.331, v17.2.0, Sep. 2022.
3rd Generation Partnership Project; Technical Specification Group Radio Access Network; NR; Physical channels and modulation (Release 17); 3GPP TS 38.211, v17.3.0, Sep. 2022.
3rd Generation Partnership Project; Technical Specification Group Radio Access Network; NR; Physical layer procedures for data (Release 17); 3GPP TS 38.214, v17.3.0, Sep. 2022.

\* cited by examiner 5.2.2.2.8 Even further enhanced Type II port selection codebook
In one example, UE processing can follow 38.214 chapter 5.2.2.2.7 Further enhanced Type II port selection codebook, with at least the following additions:
For each CSI-RS antenna port $p = \{0, 1, \ldots, P_{CSI-RS} - 1\}$ and precoding matrix index $t = \{0, 1, \ldots, N_3 - 1\}$ the received CSI-RS channel $H_t^{(p)}$ shall be modified per CSI-RS antenna port specific $d_3^{(p)}$ signaled from higher layer (see 38.321 MAC CE) before CSI reporting.

$$H_t^{(p)} = H_t^{(p)} e^{j\frac{2\pi d_3^{(p)}}{N_3}}$$

In a special case, default before gNB commands, when $d_3^{(p)} = 0$ for all CSI-RS antenna ports, then there may be no difference to 5.2.2.2.7 UE processing.

Optionally, efetype2extendedReportCsiRsPort, a UE could provide feedback to gNB of used $d_3^{(p)}$ per port with the PMI. In this example, bits per report may be minimized. Feedback may be reported for all selected $K_1$ ports. For each port, three different relative values, [-1,0,1], may correspond to offset to signaled csiRsPortDelayCompensation, see 38.321. For example, with K1=8, ROUNDUP(LOG(POWER(3,8),2),0)=13 bits may be used. If reported with PMI, the rest of PMI feedback may be aligned with this UE suggested feedback.
An alternative way to provide extend feedback may be to add MAC CE to UL-SCH direction.

FIG. 3A

New entry (for example) "CSI-RS port delay compensation" may be added to Table 6.2.1-1 (or 1a or 1b) to identify a new type of MAC CE.
New chapter 6.1.3.x "CSI-RS port delay compensation" can show detailed header format
- nzp-CSI-RS-ResourceId: (optional)
  - 8bit as defined in 38.331
  - Not needed if we only target update CSI-RS ports for Even Further Enhanced Port-Selection Type II Codebook for same
- Cp: (optional)
  - 1bit, This field indicates whether the octet containing csiRsPortNumberOffset(p) and csiRsPortDelayCompensation(p) is present.
    - If this field is set to 1, the octets CSI-RS antenna port p data is present.
    - If this field is set to 0, the octets CSI-RS antenna port p data is not present.
  - Optional; useful when all ports are not reported
- csiRsPortNumberOffset: (optional)
  - Value is p-3000. p defined in 38.211 7.4.1.5.
  - Optional; useful when all configured antenna ports are always updated.
- csiRsPortDelayCompensation: (mandatory) i.e. $d_3^{(p)}$
  - 4bit (16 delays) could be minimum
    - For example, $d_3^{(p)}$ values $[N_3-8, N_3-7, N_3-6, N_3-5, N_3-4, N_3-3, N_3-2, N_3-1, 0, 1, 2, 3, 4, 5, 6, 7]$ in 38.214. This may minimize UE changes as the UE may reorder(shift) the frequency bases.
    - Better performance may be obtained by increasing the delay resolution e.g. $[N_3-8, N_3-7, N_3-6, N_3-5, N_3-4, N_3-3, N_3-2, N_3-1, 0, 1, 2, 3, 4, 5, 6, 7]/2$.
      - Non integer values may require UE capability efetype2extendedDelayResolution
  - 6bits (64 delays) could apply, for example, $[N_3-8, N_3-7.75, ..., 7.5, 7.75]$.
  - In examples above have 0 delay aligned to middle(~1/2) of the range. One could also have unbalanced range with 0 moving closer to the end. At e.g. ¼ or 7/8 positions to have larger range to move CSI-RS ports with large delay to earlier in time.
  - Also it is also possible to create table with uneven spacing to have better resolution around 0 delay
  - In general there is not a large reason to full optimize the number of bits.
  - With even more bits, even more advanced multi tap compensation may be allocated.

FIG. 3B

Assuming all 8 CSI-RS antenna ports updated: minimum 8*4bit=4 octets

| 7 | 6 | 5 | 4 | 3 | 2 | 1 | 0 | |
|---|---|---|---|---|---|---|---|---|
| csiRsPortDelayCompensation(1) | | | | csiRsPortDelayCompensation(0) | | | | Oct1 |
| csiRsPortDelayCompensation(3) | | | | csiRsPortDelayCompensation(2) | | | | Oct2 |
| csiRsPortDelayCompensation(5) | | | | csiRsPortDelayCompensation(4) | | | | Oct3 |
| csiRsPortDelayCompensation(7) | | | | csiRsPortDelayCompensation(6) | | | | Oct4 |

Assuming all 32 CSI-RS antenna ports updated: minimum 32*4bit=16 octets

Updates may be provided for two CSI-RS antenna ports: 2*(1+1)=4octets, and there may also be allowed >4bits per csiRsPortDelayCompensation. In the example below there is also one extra octet for nzp-CSI-RS-ResourceId that could be removed.

| 7 | 6 | 5 | 4 | 3 | 2 | 1 | 0 | |
|---|---|---|---|---|---|---|---|---|
| nzp-CSI-RS-ResourceId | | | | | | | | Oct1 |
| Cp | R | R | csiRsPortNumberOffset(p1) | | | | | Oct2 |
| R | R | csiRsPortDelayCompensation(p1) | | | | | | Oct3 |
| Cp | R | R | csiRsPortNumberOffset(p2) | | | | | Oct4 |
| R | R | csiRsPortDelayCompensation(p2) | | | | | | Oct5 |

The above structure may be extended by adding rows to command >2 CSI-RS ports.

New chapter 5.18.x "CSI-RS port delay compensation" handling
- UE MAC needs to control that UE PHY has the aligned $d_3^{(p)}$ assumptions when reporting CSI to gNB. Hence, if MAC CE arrives over air interface too late vs next CSI-RS reception, then MAC must delay the update towards PHY.
- gNB is expected to be allowed to send multiple updates within the CSI-RS period.
- Typically there is no updates needed within single CSI-RS reception period.
- If a common delay is not agreed in 3GPP, then efetype2commandToReportDelay UE capability would be added. Because the updates are a slow process, it is unlikely that UE capability is needed, but a fixed delay could be assumed in MAC spec.

Optionally, efetype2extendedReportCsiRsPort, the UE may provide $d_3^{(p)}$ feedback with UL-SCH MAC CE. The format in UL direction may be similar to "CSI-RS port delay compensation" above. gNB may decide to utilize UE report in future "CSI-RS port delay compensation" commands. The UE report may not modify used $d_3^{(p)}$ value in UE PHY.

FIG. 3C

```
CodebookParametersefetype2-r1x ::= SEQUENCE {
NOTE: Basic simplest version only CSI-RS delay is adjusted with a frequency ramp, here aligning with feTypeII
   -- Basic Features of Even Further Enhanced Port-Selection Type II Codebook (EfeType-II)
   efetype2basic-r1x     SEQUENCE (SIZE (1.. maxNrofCSI-RS-ResourcesExt-r16)) OF
                                         INTEGER (0..maxNrofCSI-RS-ResourcesAlt-1-r16),
   -- Support of M=2 and R=1 for EfeType-II
   efetype2Rank1-r1x     SEQUENCE (SIZE (1..maxNrofCSI-RS-ResourcesExt-r17)) OF
                                         INTEGER (0.. maxNrofCSI-RS-ResourcesAlt-1-r16)
                                         OPTIONAL,
   -- Support of R = 2 for EfeType-II
   efetype2Rank2-r1x     SEQUENCE (SIZE (1..maxNrofCSI-RS-ResourcesExt-r17)) OF
                                         INTEGER (0.. maxNrofCSI-RS-ResourcesAlt-1-r16)
                                         OPTIONAL, NOTE: assumption is that all rank3/4 capable UEs would support this:
   -- Support of rank 3, 4 for EfeType-II
   efetype2Rank3Rank4-r1x   ENUMERATED {supported}    OPTIONAL
```

*Integer values (B=1) may result in better backwards capability of existing UE processing. Non integer values require is slightly more complex processing from UE point of view.*
```
   -- Extended resolution of $d_3^{(p)}$ for cases when it is in form A/B, B!=1
   efetype2extendedDelayResolution   ENUMERATED { supported }    OPTIONAL
```

*Capability if no agreement about fixed max delay of slots. gNB and UE must be aligned what assumption UE has used for CSI-RS ports in CSI reporting.*
```
   -- Delay in slots from (MAC CE)command to adjust CSI-RS ports to the time when CSI-RS ports are received.
   efetype2commandToReportDelay   ENUMERATED {uptoX, uptoY }    OPTIONAL -- Support of extended channel state report per CSI-RS port
   efetype2extendedReportCsiRsPort   ENUMERATED {supported}    OPTIONAL -- Support of extended CSI-RS port modification codebook. More than just a single delay
   efetype2extendedCommand-r1x   ENUMERATED {supported}    OPTIONAL
```

Additional combinations similar to etype2:
- codebookParametersfetype2PerBC-r17
- CodebookComboParameterMixedTypePerBC-r17
- CodebookComboParameterMixedType-r17
- CodebookComboParameterMultiTRP-r17::=
- CodebookComboParameterMultiTRP-PerBC-r17

Fig. 3D

| 7 | 6 | 5 | 4 | 3 | 2 | 1 | 0 | |
|---|---|---|---|---|---|---|---|---|
| colspan="8" | nzp-CSI-RS-ResourceId | | | | | | | Oct1 |
| Cp | R | R | colspan="5" | csiRsPortNumberOffset(p1) | | | | Oct2 |
| R | R | colspan="6" | csiRsPortDelayCompensation(p1) | | | | | Oct3 |

FIG. 3E

CHANNEL STATE INFORMATION OVERHEAD REDUCTION BY NETWORK SIGNALED USER EQUIPMENT SPECIFIC ADJUSTMENTS BEFORE MEASUREMENTS

FIELD

Some example embodiments may generally relate to communications including mobile or wireless telecommunication systems, such as Long Term Evolution (LTE) or fifth generation (5G) radio access technology or new radio (NR) access technology, or other communications systems including subsequent generations of the same or similar standards. For example, certain example embodiments may generally relate to reducing overhead associated with channel state information through the use of network signaled user equipment specific adjustments that can be applied by the user equipment before measurement of reference signals.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. From release 18 (Rel-18) onward, 5G is referred to as 5G advanced. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 6G is currently under development and may replace 5G and 5G advanced.

SUMMARY

An embodiment may be directed to an apparatus. The apparatus may include at least one processor and at least memory storing instructions. The instructions, when executed by the at least one processor, may cause the apparatus at least to perform receiving a configuration from a network. The instructions, when executed by the at least one processor, may also cause the apparatus at least to perform receiving reference signals in a channel from the network. The instructions, when executed by the at least one processor, may further cause the apparatus at least to perform adjusting the channel of the received reference signals based on the configuration.

An embodiment may be directed to an apparatus. The apparatus may include at least one processor and at least memory storing instructions. The instructions, when executed by the at least one processor, may cause the apparatus at least to perform receiving a configuration from a network. The instructions, when executed by the at least one processor, may also cause the apparatus at least to perform receiving a configuration update related to reference signal from a network. The instructions, when executed by the at least one processor, may also cause the apparatus at least to perform receiving subset of reference signals in a channel from the network. The instructions, when executed by the at least one processor, may also cause the apparatus at least to perform providing a report based on the subset to the network.

An embodiment may be directed to an apparatus. The apparatus may include at least one processor and at least memory storing instructions. The instructions, when executed by the at least one processor, may cause the apparatus at least to perform sending a configuration to a user equipment. The instructions, when executed by the at least one processor, may also cause the apparatus at least to perform sending reference signals in a channel to the user equipment, wherein the configuration is configured to be used by the user equipment to adjust the channel of the received reference signals.

An embodiment may be directed to an apparatus. The apparatus may include at least one processor and at least memory storing instructions. The instructions, when executed by the at least one processor, may cause the apparatus at least to perform sending a configuration to a user equipment. The instructions, when executed by the at least one processor, may also cause the apparatus at least to perform sending a configuration update related to reference signal to the user equipment. The instructions, when executed by the at least one processor, may further cause the apparatus at least to perform sending at least a subset of reference signals in a channel to the user equipment. The instructions, when executed by the at least one processor, may additionally cause the apparatus at least to perform receiving a report from the user equipment based on the subset.

An embodiment may be directed to a method. The method can include receiving a configuration from a network. The method may also include receiving reference signals in a channel from the network. The method may further include adjusting, by a user equipment, the channel of the received reference signals based on the configuration.

An embodiment may be directed to a method. The method can include receiving a configuration from a network. The method may also include receiving a configuration update related to reference signal from a network. The method may further include receiving subset of reference signals in a channel from the network. The method may additionally include providing a report based on the subset to the network.

An embodiment may be directed to a method. The method can include sending a configuration to a user equipment. The method may also include sending reference signals in a channel to the user equipment, wherein the configuration is configured to be used by the user equipment to adjust the channel of the received reference signals.

An embodiment may be directed to a method. The method can include sending a configuration to a user equipment. The method can also include sending a configuration update related to reference signal to the user equipment. The method can further include sending at least a subset of reference signals in a channel to the user equipment. The method can additionally include receiving a report from the user equipment based on the subset.

An embodiment can be directed to an apparatus. The apparatus can include means for receiving a configuration from a network. The apparatus can also include means for receiving reference signals in a channel from the network. The apparatus can further include means for adjusting the channel of the received reference signals based on the configuration.

An embodiment can be directed to an apparatus. The apparatus can include means for receiving a configuration from a network. The apparatus can also include means for receiving a configuration update related to reference signal from a network. The apparatus can further include means for receiving subset of reference signals in a channel from the network. The apparatus can additionally include means for providing a report based on the subset to the network.

An embodiment can be directed to an apparatus. The apparatus can include means for sending a configuration to a user equipment. The apparatus can also include means for sending reference signals in a channel to the user equipment, wherein the configuration is configured to be used by the user equipment to adjust the channel of the received reference signals.

An embodiment can be directed to an apparatus. The apparatus can include means for sending a configuration to a user equipment. The apparatus may also include means for sending a configuration update related to reference signal to the user equipment. The apparatus may further include means for sending at least a subset of reference signals in a channel to the user equipment. The apparatus may additionally include means for receiving a report from the user equipment based on the subset.

BRIEF DESCRIPTION OF THE DRAWINGS

For proper understanding of example embodiments, reference should be made to the accompanying drawings, wherein:

FIG. 3A illustrates a first implementation in a standard, according to certain embodiments;

FIG. 3B illustrates a second implementation in a standard, according to certain embodiments;

FIG. 3C illustrates a third implementation in a standard, according to certain embodiments;

FIG. 3D illustrates a fourth implementation in a standard, according to certain embodiments;

FIG. 3E illustrates another implementation, according to certain embodiments.

DETAILED DESCRIPTION

Figure 1:
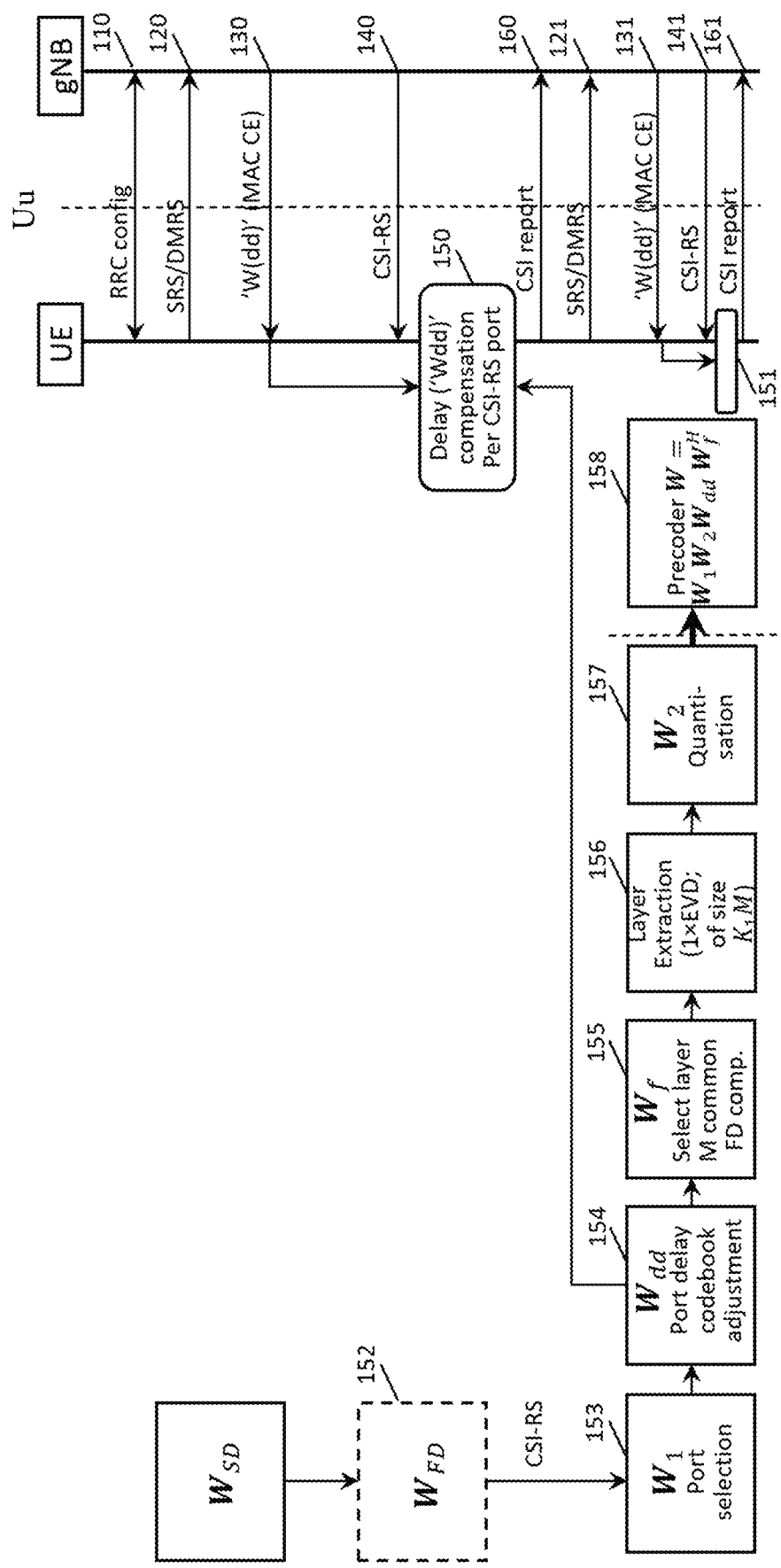
FIG. 1 illustrates signal flow and processing, according to certain embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing reducing overhead associated with channel state information through the use of network signaled user equipment specific adjustments that can be applied by the user equipment before measurement of reference signals, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments relate to wireless communications systems using codebook-based feedback for the channel state information (CSI). Precoded transmission can refer to a mechanism by which transmitted data is precoded in a way that the signal is radiated towards the receiver in a requested way. The UE can measure and compute the channel state information based on the CSI reference signal (CSI-RS) port transmissions and can feed back to the transmitter the CSI, such as rank, precoding matrix indicator (PMI), channel quality indicator (CQI), or the like.

The configured codebook can define what type of precoding matrix indicator feedback the user equipment (UE) is able to provide for the transmitter. Based on the feedback, the transmitter may know how to precode the data toward the UE.

The radio channel itself between the user equipment and the network element, such as a the next generation Node B (gNB), can have a delay and delay spread depending on the distance of the radio propagation paths. By using beamformed CSI-RS, only a part of the propagation paths are illuminated by a specific CSI-RS port. Some codebooks utilize this property to compress the channel state information to reduce CSI feedback need.

CSI-RS tracking reference signal (TRS) and synchronization signal blocks (SSBs) can be used by UE for downlink time and frequency synchronization. UE used timing may have a direct impact on UE uplink timing. The gNB can currently update UE transmission configuration indicator (TCI) state with MAC CE signaling. gNB can also control UE timing with MAC CE Timing Advance Commands.

Third generation partnership project (3GPP) methods either have low CSI-RS transmission overhead with high UE processing load and large and complex subband CSI reporting or have high CSI-RS transmission overhead with low UE processing load and low complexity CSI reporting.

For example, the 3GPP release 15 (rel15) TypeII port selection (PS) and rel16 eTypeII PS codebooks have cell specific CSI-RS accompanied by large UE processing and uplink CSI feedback to provide sub-band feedback of the radio channel. Rel16 eTypeII may have reduced UL overhead. UE specific CSI-RS TRS can be used with related DL overheads for many UEs.

The rel17 3GPP feTypeII PS codebook has the beamforming and delay/frequency management of the CSI-RS ports on the gNB side. The transmitted gNB CSI-RS port adaption may enable the CSI-RS ports to be received at the same time by the UE with small delay spread. This small delay spread may allow the UE to observe the channel as more frequency flat, thereby allowing for lower UE processing need and also allowing for minimized CSI reporting.

It may be difficult to reuse the CSI-RS transmissions between multiple UEs. As a result, there may be the need for UE specific CSI-RS and therefore large DL overheads with large number of UEs because CSI-RS need to be transmitted separately for the UEs. In specific scenarios when many UEs observe a similar delay spread, such as a train or bus, profile per CSI-RS port, it would be possible to reuse CSI-RS ports. Management of shared CSI-RS ports may be challenging and may require modifications to RRC signaling.

Certain embodiments may make 3GPP defined Rel-17 feType II PS codebook to be more usable by reducing the CSI-RS overhead. Certain embodiments may allow the use of even cell-specific CSI-RS ports.

Certain embodiments may provide an effective codebook solution that can be used for a large number of UEs. It may be possible to support a few UEs in time division duplex (TDD) using wideband short term transmit antenna switching SRS based transmit pre-equalizers, but it may not be possible to allocate high amount of SRS resources for many UEs at the same time. Frequency division duplex (FDD) massively multiple-input multiple-output (mMIMO) systems may have an even larger benefit from improved codebook based methods.

Certain embodiments may enable the usage of cell-specific CSI-RS while still allowing UE to observe a mainly frequency flat radio channel similar to feTypeII PS.

This may be done by having separate UE-specific signaling from the gNB to the UE about how the UE can adjust the received CSI-RS port signals before doing the measurements and providing the CSI feedback.

Thus, in certain embodiments there may be a signaling from gNB to UE related to codebooks, for example with a medium access control (MAC) control element (CE) from a MAC layer of gNB to the UE. The signaling can be absolute or relative. Absolute indication of the adjustment may minimize the possibility of misalignment.

In certain embodiments, there may be UE-specific modification of CSI-RS port signals before measurements for CSI reporting. Additionally, in certain embodiments there may be feedback from the UE to the gNB about the codebook or CSI-RS port feedback about how the UE would prefer to adjust the delays per CSI-RS port. The feedback can be provided with the CSI report or, for example, in a UL MAC CE.

As beamwidths decrease with larger antenna arrays, it is even more practical for CSI-RS ports to illuminate only a single dominant radio path. In such a case, delay compensation without further adjustments may produce a frequency flat channel from the UE point of view.

Another way to reduce CSI-RS overhead would be to make it easier to dynamically select what CSI-RS ports the UE is monitoring. RRC signaling could provide a large set of CSI-RS ports, but only a subset may be active at the same time. A signal, such as a MAC CE, can be used to down select what CSI-RS ports the UE should use based on the UE real-time capability. The UE may still be allowed then to do port selection for the actual reporting.

Another option may be to allow signal, for example via MAC CE, of the used codebook. This may help to minimize UE power consumption. An advanced codebook may be triggered when a UE gets a benefit from the more advanced codebook.

Separate UE specific signaling from the gNB to the UE about how the UE should adjust the received CSI-RS TRS port and optionally SSB before using them for timing and synchronization purposes may be provided in certain embodiments. Such aspects may make the transitions between TCI states smooth to enable that UE would not need to reset the tracking loops. As a positive side effect this will also make UL timing more stable as UE would not suddenly transition between the different TCI state timings. UE would also be aware to expect transmissions with a smaller delay spread.

FIG. 1 illustrates signal flow and processing, according to certain embodiments. The processes of FIG. 1 may be viewed as different from 3GPP defined feTypeII PS. Other active physical channels like physical downlink shared channel (PDSCH), physical downlink control channel (PDCCH), physical uplink control channel (PUCCH), and physical downlink shared channel (PDSCH) are not shown in FIG. 1 for simplicity of illustration and explanation.

The configuration of UE can be agreed with RRC signaling at 110, between the UE and the network, which may provide radio access using, for example, a gNB.

UL reference signals, such as sounding reference signal (SRS) and demodulation reference signal (DMRS) at 120 may be used to estimate the radio channel per CSI-RS port per UE.

At 130, $W_{dd}$ delay domain adjustment commands can be sent to UE with signaling such as, for example, MAC CE. Such signals can be used for UE and CSI-RS port specific delay adaptation. Signaling can be absolute or relative. Only a subset of CSI-RS ports per UE may need correction or other adjustment, because UE port selection, shown at 153, may include the subset. It can be specified how much earlier the command at 130 should be received or acknowledged by the UE (not shown in FIG. 1, but may occur after 130) before the command at 130 is to be taken into use by the UE at 150.

More specifically, at 150, the UE may apply delay compensation per CSI-RS port, based on the $W_{dd}$ delay domain adjustment commands.

The reference signals sent at 140 can be cell specific CSI-RS or at least for a large group of UEs. In certain embodiments, at 152, feTypeII type of $W_{FD}$ frequency domain delay adjustments the radio channel can be done. Such adjustments may not be needed because compensation may also be done in a new way at UE side.

Figure 2:
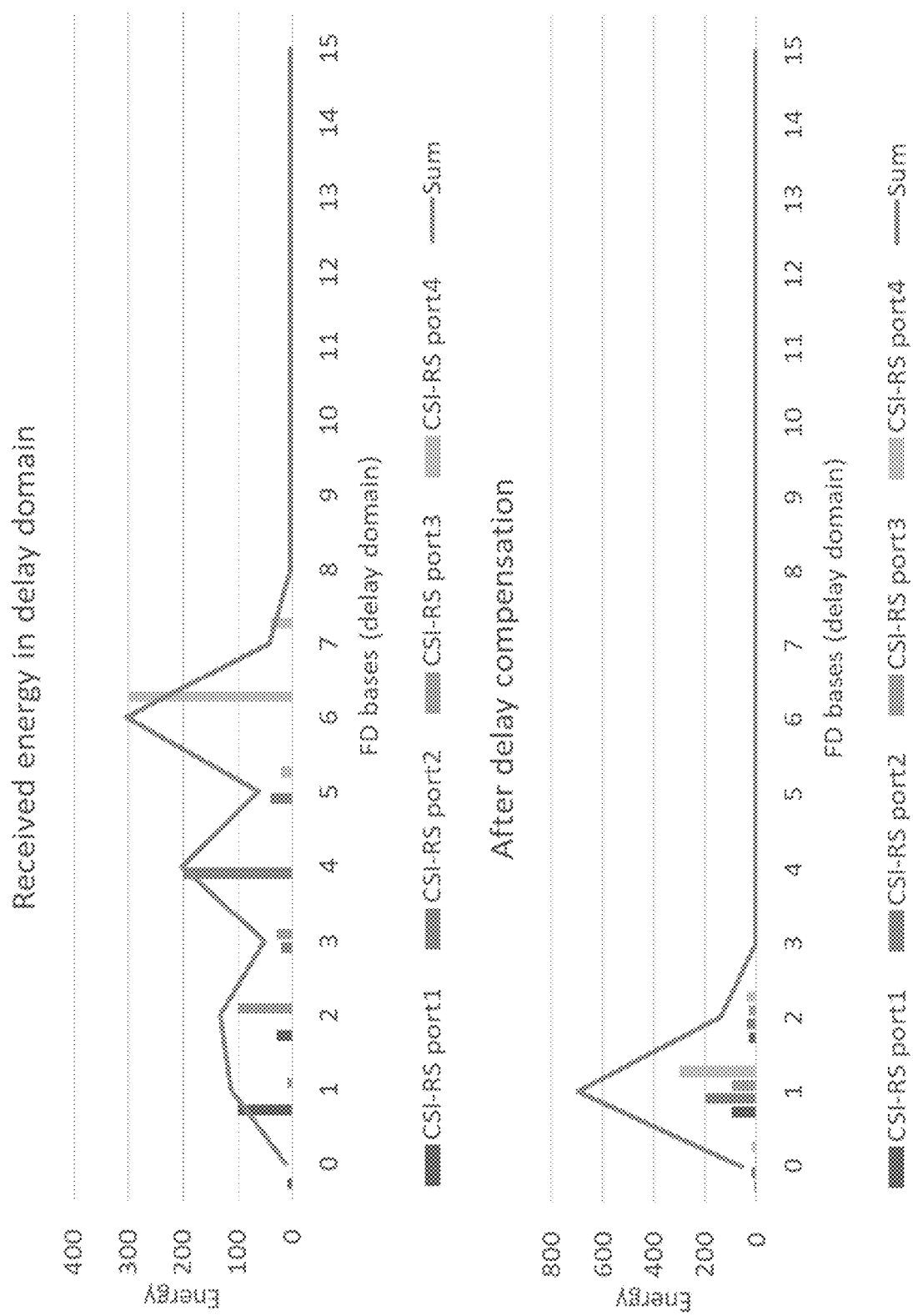
FIG. 2 illustrates the effects of delay compensation through adjustment, according to certain embodiments.

As mentioned above, the UE CSI-RS receiver chain can, at 154, use the $W_{dd}$ per CSI port. One simple form the codebook is just a delay per CSI-RS port causing a frequency domain rotation, as shown in FIG. 2. In such a case, the UE may only need to shift the measured FD bases based on requested FD bases per CSI-RS port before selecting the joint FD bases over all CSI-RS ports.

The adjustment step at 154 could also be, for example, performed before port selection 153 or at any other suitable location for UE receiver implementation.

At 160, the UE can provide feTypeII type of CSI feedback after the UE has done $W_{dd}$ adjustment, as well as other processing, such as layer selection at 155, layer extraction at 156, and quantization at 157. Thus, as shown at 158, the precoder may be characterized in terms of $W_{dd}$.

There may, optionally, be additional feedback related to $W_{dd}$, which can be provided at 160 or separately. Corrections can be expressed relative to the command signaled in MAC CE at 130.

Optionally, the UE may already provide the rest of CSI feedback with corrected $W_{dd}$ at 160, as mentioned above. However, the feedback path may alternatively be MAC CE in UL.

feTypeII is used as an example, but other codebook(s) and feedback could also be used. The precoder, for example as characterized at 158 for, for example, PDSCH can use information from the CSI report at 160.

The same process can be applied repeatedly, such that additional SRS/DMRS can be sent at 121 similar to the SRS/DMRS sent at 120. Likewise, further instructions can be provided at 131 similar to the instructions provided at 131. The further instructions at 131 may be absolute or may be relative to the instructions provided at 130. At 151, delay compensation may be applied, prior to providing a further CSI report at 161.

FIG. 2 illustrates the effects of delay compensation through adjustment, according to certain embodiments. In this example, a codebook allows the gNB to adjust the delays of CSI-RS ports to reduce the delay spread. As shown in FIG. 2, after delay compensation CSI-RS ports are aligned to 'delay' 1, but could also be aligned to the 0 or DC component. In this example illustrated in FIG. 2, based on $W_{dd}$ gNB commands, Port1 is not modified, Port2 max moves from 4 to 1, Port3 max moves (shifted) from 2 to 1, and Port4 moves (shifted) from 6 to 1, before the common bases determination that is, in this example, 1.

Various modifications may be to standards specifications to implement certain embodiments. For example, the third generation partnership project (3GPP) technical specification (TS) 38.214 may be provided with a new chapter, as shown in FIG. 3A. Thus, FIG. 3A illustrates a first implementation in a standard, according to certain embodiments. 3GPP TS 38.211 7.4.1.5.3 is one alternative location in the 3GPP standards that could include CSI-RS modification per port that the UE is expected to do. Also, the defined resolution could be at, for example, the subcarrier level instead of $N_3$ resolution. A larger resolution could also be used in 3GPP TS 38.214 or even 3GPP TS 38.321.

FIG. 3B illustrates a second implementation in a standard, according to certain embodiments. As shown in FIG. 3B, 3GPP TS 38.321 can be provided with a new chapter. In FIG. 3B, the references to features being mandatory or optional are with reference to the specific illustrated embodiments. In other embodiments, the features illustrated as mandatory may be optional.

FIG. 3C illustrates a third implementation in a standard, according to certain embodiments. FIG. 3C more particularly shows additional aspects of a new chapter of 3GPP TS 38.321.

FIG. 3D illustrates a fourth implementation in a standard, according to certain embodiments. As shown in FIG. 3D, 3GPP TS 38.331 can be updated.

There are also other alternative ways to reduce CSI-RS overhead, such as updating a set of CSI-RS resources that the UE is to monitor and report. For example, a new chapter of 3GPP TS 38.321 can provided with a new entry, for example "nzp-CSI-RS-ResourceId list update" in Table 6.2.1-1 (or 1a or 1b) table to identify this new type of MAC CE. This entry may identify a new MAC CE with list of nzp-CSI-RS-ResourceIds that should be used for reporting.

As another option, CSI-RS overhead may be reduced by updating a set of CSI-RS ports that the UE is to monitor and report. For example, a new chapter of 3GPP TS 38.321 may provided with a new entry, for example "csiRsPortNumberOffset list update" in Table 6.2.1-1 (or 1a or 1b) table to identify this new type of MAC CE. The entry may identify a new MAC CE with list of csiRsPortNumberOffsets that are to be used for reporting.

Both of these options may correspond to an own UE capability. Adjusting delay of other CSI-RS, for example TRS, may be done with a similar message as described above and illustrated in FIG. 3C. FIG. 3E illustrates another implementation, according to certain embodiments. nzp-CSI-RS-ResourceId in FIG. 3E can refer to CSI-RS resourceId mapped to TRS. This option may correspond to a UE capability, as well.

Figure 4:
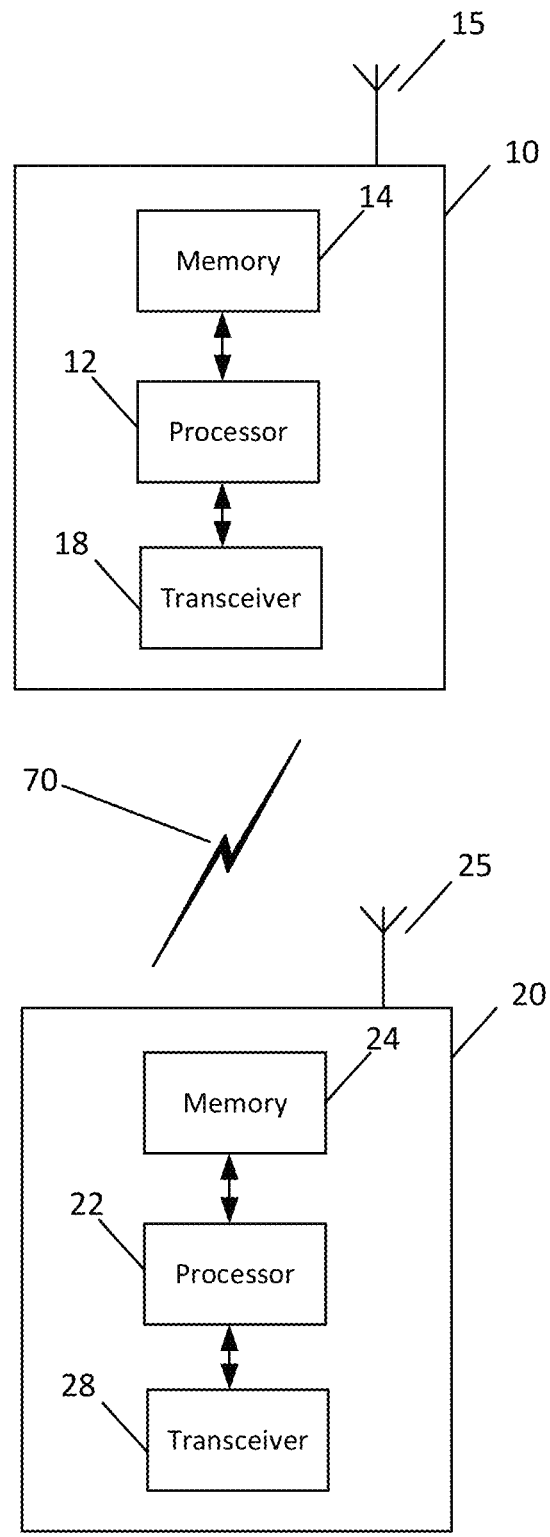
FIG. 4 illustrates an example block diagram of a system, according to an embodiment.

FIG. 4 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may include an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 4.

As illustrated in the example of FIG. 4, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 4, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to reducing overhead associated with channel state information through the use of network signaled user equipment specific adjustments that can be applied by the user equipment before measurement of reference signals.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be include any combination of random access memory (RANI), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna (s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultra-wideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1 through 3E, or any other method described herein. In some embodiments, as discussed herein, apparatus 10 may be configured to perform a procedure relating to providing reducing overhead associated with channel state information through the use of network signaled user equipment specific adjustments that can be applied by the user equipment before measurement of reference signals, for example.

FIG. 4 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4.

As illustrated in the example of FIG. 4, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can include any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDM symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1 through 3E, or any other method described herein. For example, in an embodiment, apparatus 20 may be controlled to perform a process relating to providing reducing overhead associated with channel state information through the use of network signaled user equipment specific adjustments that can be applied by the user equipment before measurement of reference signals, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may provide various benefits and/or advantages. For example, certain embodiments may provide low CSI-RS transmission overhead with low UE processing load and low complexity CSI feedback. Likewise, certain embodiments may avoid, minimizes, or reduce sudden, large changes in UE timing and uplink (UL) timing when TCI state of the UE is modified. An additional benefit or advantage may be UE power savings from fast swapping of a used codebook.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

The term "non-transitory" as used herein, is a limitation of the medium itself (i.e. tangible, not a signal) as opposed to a limitation on data storage persistency (e.g. RAM vs. ROM).

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

CSI-RS Channel State Information Reference Signal
MAC CE MAC Control Element, see e.g. 38.321
CSI Channel State Information
EVD Eigenvalue decomposition
SRS Sounding reference signal
DMRS Demodulation reference
TCI Transmission Configuration Indicator, see e.g. 38.321
FD frequency domain
Dd delay domain (as distinct from the FD compensation done in gNB side in feTypeII. For example, delay change can cause a rotation in the frequency domain signal)

I claim:
1. An apparatus, comprising:
at least one processor; and
at least one memory storing instructions that, when executed by the at least one processor, cause the apparatus at least to perform
receiving a configuration from a network, wherein at least a portion of the configuration is provided in a control element of medium access control, wherein the configuration is indicative of an absolute delay domain adjustment, wherein the configuration is related to a Rel-17 feTypeII codebook used by the apparatus, and wherein the configuration is indicative of a set of channel state information reference signal (CSI-RS) ports to be used by the apparatus, wherein the CSI-RS ports are selected based on a real-time capability of the apparatus;

receiving cell-specific reference signals in a channel from the network, wherein the cell-specific reference signals comprise channel state information reference signal port signals and synchronization signal block signals;

adjusting the channel of the received cell-specific reference signals based on the configuration;

providing a report after adjustments to the network, wherein at least a portion of the report is provided in a control element of medium access control, wherein the report comprises an extended channel state report per channel state information resource signal port, having a non-integer delay resolution;

updating a transmission timing after adjustments to the cell-specific reference signals, wherein the updated timing is aligned to a common delay reference among the CSI-RS ports;

informing supported command to report delay to network, wherein the report is responsive to the command;

informing supported adjustment resolution to network;

informing supported adjustment of plurality of delay taps to network; and providing feedback to the network regarding the configuration and the codebook used by the apparatus, wherein the feedback is provided within the report, wherein the codebook includes a delay per CSI-RS port causing a frequency domain rotation, and wherein the feedback includes an eType-II feedback.

\* \* \* \* \*